Figure 1:
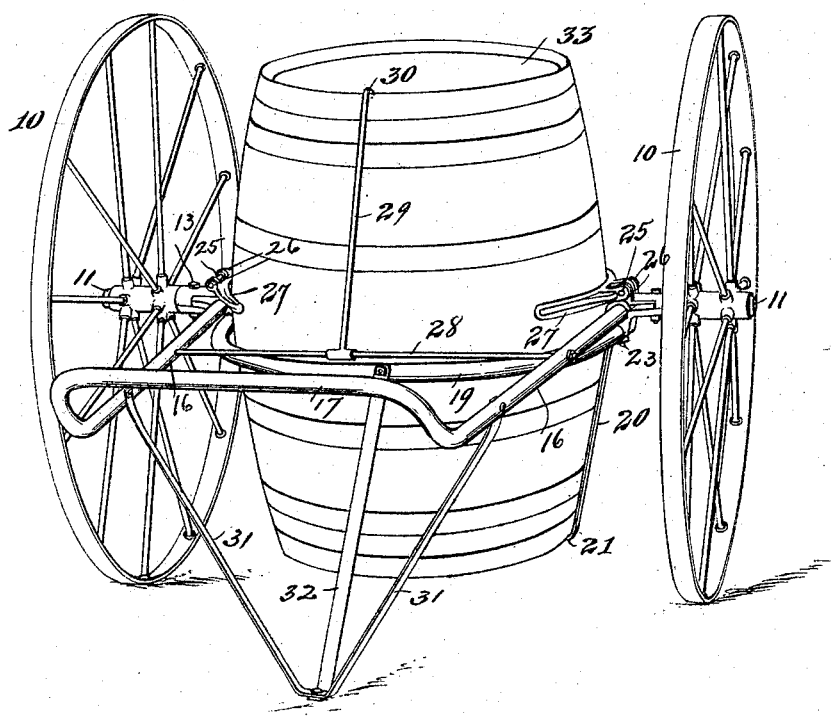

No. 638,215. Patented Dec. 5, 1899.
H. F. CONDON.
BARREL CART.
(Application filed Apr. 17, 1899.)

(No Model.) 2 Sheets—Sheet 1.

Witnesses,

Inventor,
Henry F. Condon,
By Offield, Towle & Linthicum,
Attys.

No. 638,215. Patented Dec. 5, 1899.
H. F. CONDON.
BARREL CART.
(Application filed Apr. 17, 1899.)
(No Model.) 2 Sheets—Sheet 2.
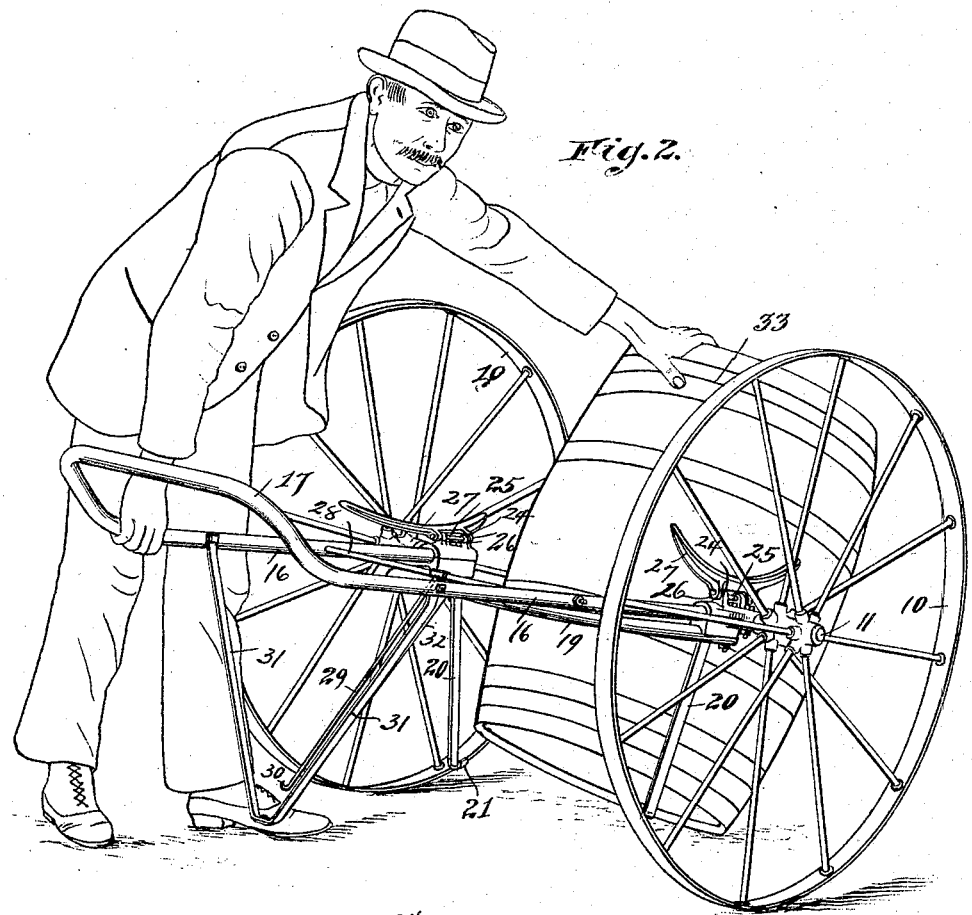
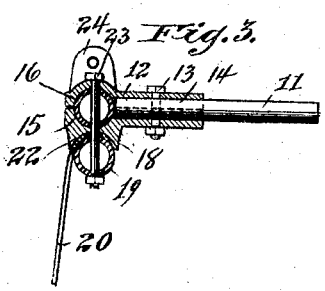
Witnesses,
Inventor,
Henry F. Condon,
By Offield, Towle & Linthicum,
Atty's.

UNITED STATES PATENT OFFICE.

HENRY F. CONDON, OF DE KALB, ILLINOIS.

BARREL-CART.

SPECIFICATION forming part of Letters Patent No. 638,215, dated December 5, 1899.

Application filed April 17, 1899. Serial No. 713,367. (No model.)

*To all whom it may concern:*

Be it known that I, HENRY F. CONDON, of De Kalb, in the county of De Kalb and State of Illinois, have invented certain new and useful Improvements in Barrel-Carts, of which the following is a specification.

This invention relates to barrel-carts, and has for its object to provide a barrel cart or truck of comparatively inexpensive construction which is adapted not only for use as a cart which will carry a barrel in an elevated position and permit it to be tilted or turned so as to pour out its contents, but will also be capable of use as a truck to lift the barrel from the ground.

To these ends my invention consists in certain novel features which I will now proceed to describe and will then particularly point out in the claims.

In the accompanying drawings, Figure 1 is a perspective view of a barrel-cart embodying my invention, the same being shown with the barrel lifted and in an elevated position. Fig. 2 is a similar view showing the cart in use as a truck for the purpose of lifting a barrel from the ground, and Fig. 3 is a detail sectional view of one end of the frame and axle.

In the said drawings the wheels of the cart are indicated at 10, said wheels being of any suitable construction and being mounted upon short stub-axles 11, which are secured to castings 12 on each side of the cart by means of bolts 13 or like securing devices. In the construction shown the casting 12 is shown divided horizontally into two parts, having formed between them a seat 14, into which the stub-axle 11 fits. The castings 12 are T-shaped in general plan, and each casting is provided with a seat 15, arranged at a right angle to the seat 14, said seats 15 being adapted to receive the rear ends of the shafts 16. These shafts are preferably constructed of tubular iron, such as gas-pipe, formed in one piece with the front cross-piece 17 and bent to shape, as shown. On their under sides the castings 12 are provided with seats 18 to receive the ends of a semicircular cross piece or brace 19, also preferably constructed of tubular metal, such as gas-pipe, bent to shape and serving to connect the castings 12 and axles 11 carried thereby, while at the same time leaving a free and unobstructed space between said castings in the line of the axles. The cart-frame is also provided with downwardly-extending and slightly-converging arms 20, which are substantially rigid, their lower ends being provided with hooks 21, which are adapted to engage the chime of a barrel. These arms are preferably connected to the cart-frame in the manner shown in detail in Fig. 3, their upper ends being bent into semicircular shape, as shown at 22, to fit between the seats 18 and the ends of the semicircular cross-bar 19 and being secured in position by the bolt 23, which passes downward through both parts of the casting 12 and also through the members 16, 22, and 19. Each of the castings 12 is provided upon its upper inner part with lugs 24, and through these lugs passes a pivot bolt or pin 25, which also passes through similar lugs 26 on a clamping-jaw 27, which is thus pivotally connected with the frame of the cart and has its inner face curved to conform to the shape of the barrel to be held. It will be observed that these clamping-plates lie at the inner ends of the axles of the cart and on opposite sides of the clear space formed in the frame between said axles and are capable of being either turned down into the position shown in Fig. 1 of the drawings to engage a barrel placed between them or swung out into the position shown in Fig. 2 of the drawings, so as to be free from engagement with said barrel. Some little distance forward of their rear ends the shafts 16 are connected by a cross bar or rod 28, to which is pivotally connected a rod 29, terminating at its free end in a hook 30, which is adapted to engage with the chime of the barrel, at the upper end thereof, as shown in Fig. 1, when the barrel is in place in the cart.

A suitable supporting-foot for the front of the cart may be provided by means of the V-shaped member 31, the upper ends of which are connected to the shafts 16, while the lower portion is connected by a brace 32 with the forward portion of the curved cross-piece 19.

The cart thus constructed is adapted for use not only as a cart for transporting a barrel from one place to another, but also as a truck, by means of which the barrel may be lifted from the ground. In the performance of this latter operation the barrel, which is indicated at 33, is tilted upon its lower edge, as indicated in Fig. 2, while the cart is approached to it with the clamping-jaws 27 thrown upward out of the way, as indicated in said Fig. 2, and the hooked rod 29 lowered. This rearward movement of the cart brings the hooks 21 of the downwardly-extending arms 20 underneath the lower chime of the barrel, and the barrel may then be lowered until it rests upon these hooks and the clamping-jaws 27 swung down so as to bear against the bilge of the barrel, as shown in Fig. 2 of the drawings. All of these operations may be performed by a single attendant, so that the barrel may be readily placed in position in the cart and raised from the ground without requiring the assistance of an extra attendant. The weight of the barrel comes partly upon the pivoted clamping-jaws 27 and by its downward pressure on these tends to force them more firmly into contact with the sides of the barrel, and in practice I prefer to spring the two rear ends of the frame somewhat apart after the barrel is in place, so as to permit the barrel to settle down to a firmer position between the clamping-jaws and be thereby more firmly held between them. The hooked rod 29 may then be swung up and its hooked end 30 engaged with the upper chime of the barrel, which is then securely held in the cart and may be tilted into a horizontal or approximately horizontal position for the purpose of pouring out its contents or for any other purpose without any danger of its becoming displaced from the cart. The entire cart being constructed of metal is strong and durable and at the same time comparatively light and may be constructed at a comparatively small expense.

I claim—

1. A barrel-cart having laterally-projecting axles provided with wheels, and a frame having an open space at the rear between said axles to receive a barrel, downwardly-extending substantially rigid arms adapted at their lower ends to engage the bottom of the barrel, and curved clamping-jaws pivotally connected with the frame at the inner ends of the axles and adapted to automatically clamp the sides of the barrel, substantially as described.

2. A barrel-cart having laterally-projecting axles provided with wheels, and a frame having an open space at the rear between said axles to receive a barrel, downwardly-extending substantially rigid arms adapted at their lower ends to engage the bottom of the barrel, curved clamping-jaws pivotally connected with the frame at the inner ends of the axles and adapted to automatically clamp the sides of the barrel, and a hooked rod pivotally connected with the frame and adapted to detachably engage the upper edge of the barrel, substantially as described.

3. A barrel-cart frame comprising an integral cross-bar and shafts, castings secured to the rear ends of said shafts, a semicircular cross-piece connected with said castings, stub-axles mounted in said castings and extending outwardly therefrom, wheels mounted on said stub-axles, curved clamping-jaws pivotally mounted on the inner upper sides of said castings, and substantially rigid arms secured to said castings and extending convergently downward therefrom, said arms being adapted at their lower ends to engage the lower edge of the barrel, substantially as described.

HENRY F. CONDON.

Witnesses:
FREDERICK C. GOODWIN,
IRVINE MILLER.